United States Patent
King

[19]

[11] Patent Number: 5,904,614
[45] Date of Patent: May 18, 1999

[54] FIBER OPTIC TERMINAL TIP POLISHING TOOL

[75] Inventor: Wesley A. King, Orange, Calif.

[73] Assignee: McDonnell Douglas Corporation, St. Louis, Mo.

[21] Appl. No.: 08/974,634

[22] Filed: Nov. 19, 1997

[51] Int. Cl.[6] .............................. B24B 41/06; B24B 13/05
[52] U.S. Cl. ............................................ 451/386; 451/390
[58] Field of Search .................................. 451/386, 390, 451/391, 365, 41

[56] References Cited

U.S. PATENT DOCUMENTS

| | | | |
|---|---|---|---|
| 4,330,965 | 5/1982 | Clark | 451/365 |
| 4,539,776 | 9/1985 | Weaver, Jr. | 451/319 |
| 4,999,955 | 3/1991 | Saito et al. | 51/283 |
| 5,018,316 | 5/1991 | Mulholland et al. | 451/365 |
| 5,201,148 | 4/1993 | Rupert et al. | 451/364 |
| 5,463,709 | 10/1995 | Terao et al. | 385/85 |
| 5,497,443 | 3/1996 | Jie et al. | 385/134 |
| 5,547,418 | 8/1996 | Takahashi | 451/278 |
| 5,557,696 | 9/1996 | Stein | 385/75 |

FOREIGN PATENT DOCUMENTS 55-115009 9/1980 Japan .

*Primary Examiner*—Robert A. Rose
*Attorney, Agent, or Firm*—Brooks & Kushman P.C.

[57] ABSTRACT

A hand tool for polishing the tip of a fiber optic terminal. The tool includes a base having a central opening that receives a collet through which the fiber optic terminal extends. The fiber optic terminal is gripped by the collet as a collet spring force is exerted on the collet. An axial force is applied to the collet as the base rests on a polishing surface, the force being established by a piston spring that maintains the tip of the fiber optic terminal in contact with the polishing surface, whereby the tip of the fiber optic terminal may be polished.

5 Claims, 3 Drawing Sheets

FIBER OPTIC TERMINAL TIP POLISHING TOOL

TECHNICAL FIELD

The invention relates to fiber optic cables, particularly tools for polishing the tips of fiber optic cable terminals.

BACKGROUND

Transmission of information, including analog and digital data, using fiber optic cables has become common as an alternative to conventional wire transmission arrangements. Fiber optic cables have distinct advantages over coaxial cables for video signals, for example, as well as over electrical wiring for transmission of information. It is particularly advantageous to use fiber optic cables to enhance transmission security and to allow an increased number of transmission paths for a given cross-sectional cable area. Fiber optic cables further provide relatively low signal loss for a given transmission distance, which makes it possible to reduce the number of booster stations. Fiber optic cables are also relatively immune from electromagnetic interference.

Fiber optic cables include an inner glass core of very small diameter. The inner glass core, which is appropriately described as a fiber strand, is normally encased in an outer protective ceramic sleeve of a diameter that may be approximately 125 microns compared to a diameter of 8 microns, for example, for a single glass fiber strand. The glass strand and sleeve are surrounded by a silicon cladding as part of a buffer jacket that may include an outer polyurethane covering. The diameter of the jacket may be approximately 5 mm.

The fiber optic cable at its end is mounted in a connector. The connector typically would be supported by a coupling mounted on a panel. A companion fiber optic cable would be mounted in a corresponding connector and arranged in a coupling with the axes of the fiber optic strands in alignment. The ends of the fiber optic strands would engage in abutting relationship at an interface point.

In a typical fiber optic cable environment, the end surfaces of the fiber optic strands at the interface may accumulate dirt and dust particles and other contaminants such as grease. This causes degradation in the amount of light energy that may be transferred through the fiber strands. In the maintenance of fiber optic cable installations, it is known practice to disassemble the connectors at the ends of the fiber optic cable assemblies and to clean the ends of the fiber cable strands with a cleaning device and a cleaning solution.

It is known in the prior art also to polish the end of a fiber optic strand during manufacture. U.S. Pat. Nos. 4,999,955 and 5,463,709, for example, show methods and apparatus for polishing the end of a fiber optic cable and machining the fiber optic cable ends with a spherical end face. Fiber optic cable ends that are machined with a spherical profile, however, tend to develop high stress concentrations at the fiber optic contact points. This may induce cracking of the glass core of the fiber optic cable, which would impair the ability of the cable to transmit light energy in an operating environment in which the cables are subjected to mechanical vibrations, such as a spacecraft environment. Flat cable ends would be preferred in such environments over the spherical ends. The machining and polishing apparatus intended for use in the manufacture of cables with spherical cable ends, however, cannot be used in polishing a flat fiber optic strand end.

The prior art includes also optical fiber end surface polishing devices intended for use with cable terminal tips with flat ends, examples of which are described in U.S. Pat. No. 5,547,418 and Japanese Patent Publication 55-115009. Such conventional apparatus for machining and polishing flat fiber optic terminal tips are intended, however, primarily for use in the manufacture of fiber optic cables rather than as maintenance tools for polishing fiber optic terminal tips after installation of the fiber optic cables. Typically, such conventional apparatus do not include a simple and feasible means for maintaining the close dimensional tolerances required for most fiber optic cable designs.

A disadvantage of some known polishing tools for fiber optic terminal tips is the necessity to disassemble the fiber optic cable itself in order to carry out fiber optic terminal tip polishing as part of the manufacturing or the maintenance procedure.

DISCLOSURE OF THE INVENTION

It is an objective of the invention to provide a fiber optic terminal tip polishing mechanism for flat-end fiber optic strands that achieves precise control of the polishing pressure and the axial dimension of the fiber optic terminal tip, as well as the flatness of the tip, without the need for complex apparatus of the type typically used presently during manufacture of a fiber optic cable.

It is a further objective of the invention to provide a fiber optic terminal tip polishing mechanism that makes use of a polishing medium such as aluminum oxide, which may be applied to a flat polishing plate that preferably has a hard, compressed fabric (i.e., resin-based felt) surface, wherein provision is made for establishing a uniform polishing force.

The invention includes a collet through which a fiber optic terminal tip is inserted. The collet is mounted in an opening in a floating piston situated in an opening in a base assembly that is supported on a polishing surface. The collet and the piston are connected together to form a unitary assembly. The collet has grip portions or jaws that grip the fiber optic cable terminal tip. The piston has a cone surface at one end which registers with a cone surface on the collet. A collet spring is used to establish a locking force on the collet, which holds the fiber optic terminal tip firmly in place during the polishing operation. A piston spring establishes a polishing force on the piston. Axial adjustment of the piston in the base opening is effected by a locking element for precisely positioning the piston relative to the base surface.

A polishing agent, such as aluminum oxide in the form of an aqueous slurry, is spread on the flat polishing plate surface. As the base is manually moved about the polishing plate surface, provision is made for evacuating or flushing the slurry through the base using water or another appropriate washing medium, thereby preventing a build-up of the polishing agent.

When the fiber optic terminal tip is polished, it is reassembled with the polished flat tip end in abutting relationship with respect to a companion fiber optic terminal tip end. The manufacture or maintenance operation may be carried out without the necessity of assembly and reassembly of the entire fiber optic cable system.

In accordance with a further objective, the fiber optic tip polishing tool of the invention does not require electric driving motors or other electric equipment. This feature is of significance when the tool is to be used in an explosive atmosphere or other hazardous atmosphere.

While an embodiment of the invention is illustrated and described, this embodiment should not be construed to limit the invention. It is anticipated that various modifications and alternative designs may be made without departing from the scope of the invention.

BEST MODE FOR USING THE INVENTION

Figure 1:
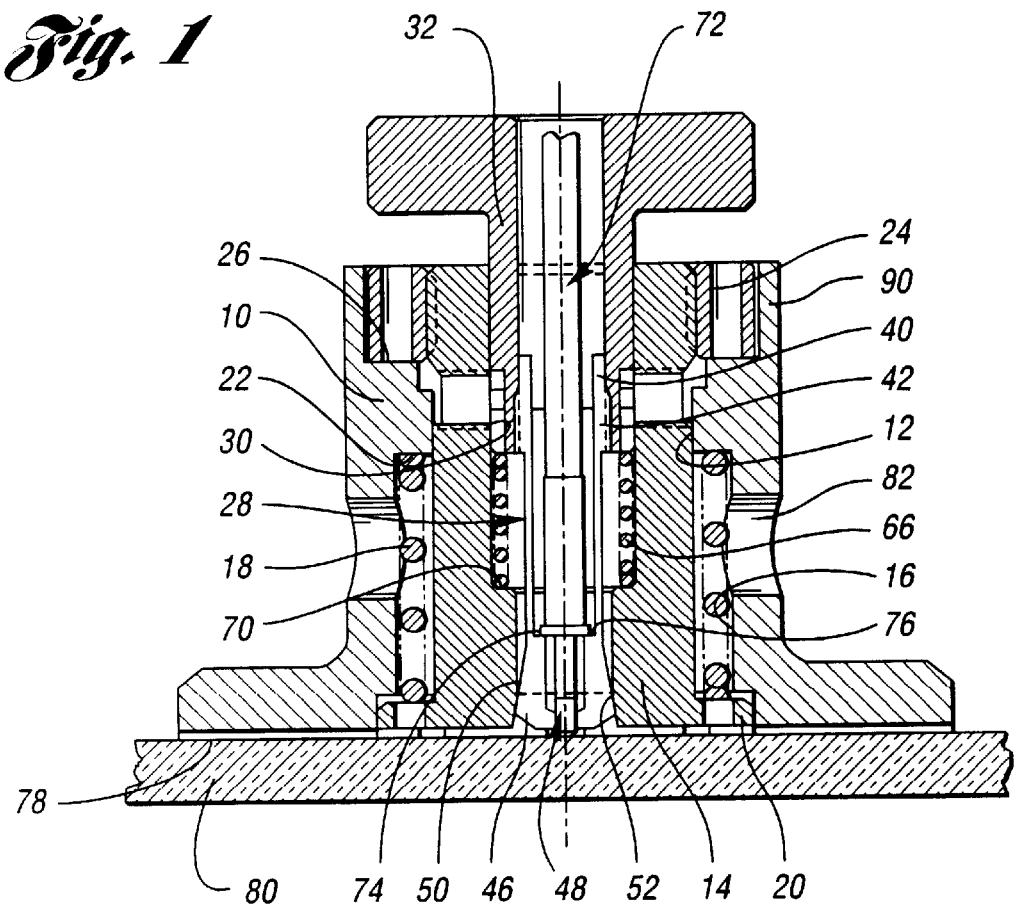
FIG. 1 is a cross-sectional assembly view of a fiber optic terminal tip polishing mechanism incorporating the features of the invention.

In the assembly view of FIG. 1, a cylindrical base assembly is shown at 10. It is provided with a central opening 12, which receives a piston 14. The opening 12 has an enlarged diameter section 16 in which is positioned a relatively low-rate piston spring 18. Typically, the force exerted by the spring 18, when it is assembled as shown in FIG. 1, would be about 3–5 lbs.

The spring 18 is seated on a shoulder 20 located at the lower end of the piston 14. Spring 18 is seated also on an annular shoulder 22 in the base assembly 10. The upper portion of the piston 14 is threaded as shown. A locking ring 24 with internal threads is threaded on the upper portion of the piston. It rests on an annular surface 26 at the upper end of the base assembly 10. By adjusting the locking ring 24 relative to the piston 14, the fiber optic terminal tip protrusion at the lower flat surface of base assembly 10 may be controlled as will be explained subsequently.

A collet 28 extends through an opening 30 in the piston 14. The collet is assembled to a handle 32 which is inserted into the opening 30.

Figure 5:
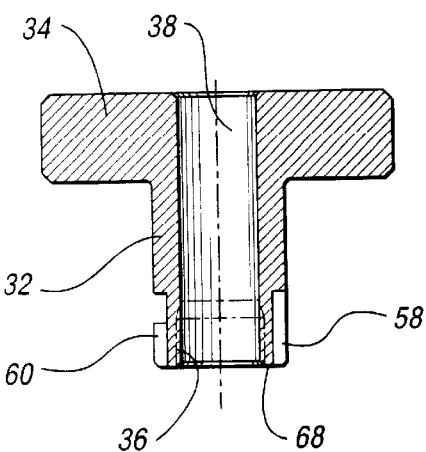
FIG. 5 is a cross-sectional view of the handle illustrated in the assembly view of FIG. 1.

As seen in FIG. 5, the handle 32 includes a hand grip portion 34 at its upper end and an internally threaded portion 36 at its lower end. The threads of the threaded portion 36 are in a central opening 38 in which is screwed the upper end of the collet as shown at 40. The collet has a threaded portion 42 which is threaded into the internally threaded portion 36 of the handle 32.

Collet 20 includes also collet fingers 44, the lower ends of the fingers being provided with jaws 46. These are sized to accept a fiber optic terminal tip, which is designated generally in FIG. 1 by reference numeral 48.

The fingers 44 are cantilevered and are flexible in known fashion. The fixed ends of the fingers are secured to the upper end 40 of the collet 28. Each jaw 46 is provided with a cone surface 50 which is engageable with an internal cone surface 52 in the piston 14. The cone surface 52 is located at the lower end of the piston opening 30. The fingers 44 compress sufficiently to permit assembly of the collet through piston opening 30.

Figure 2:
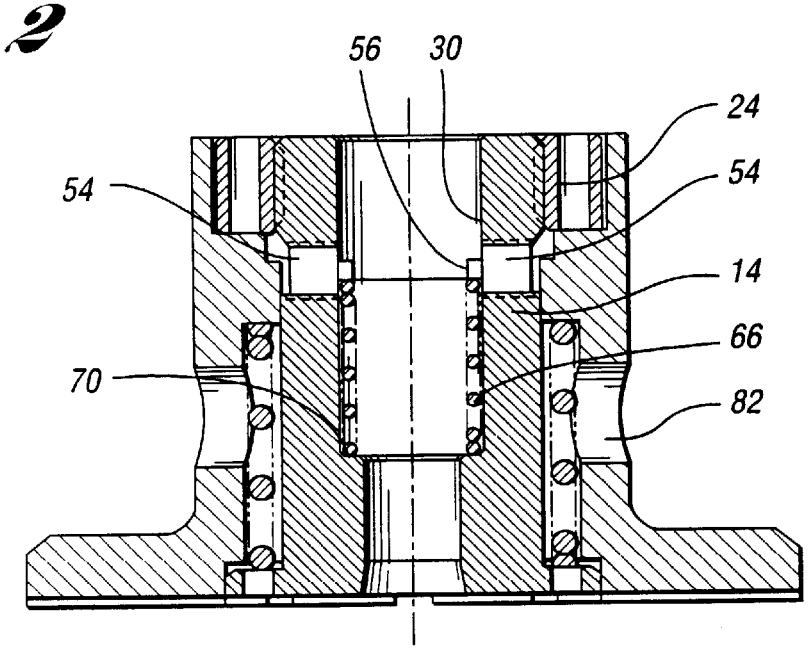
FIG. 2 is a partial assembly view of the piston portion of the assembly of FIG. 1.
Figure 3:
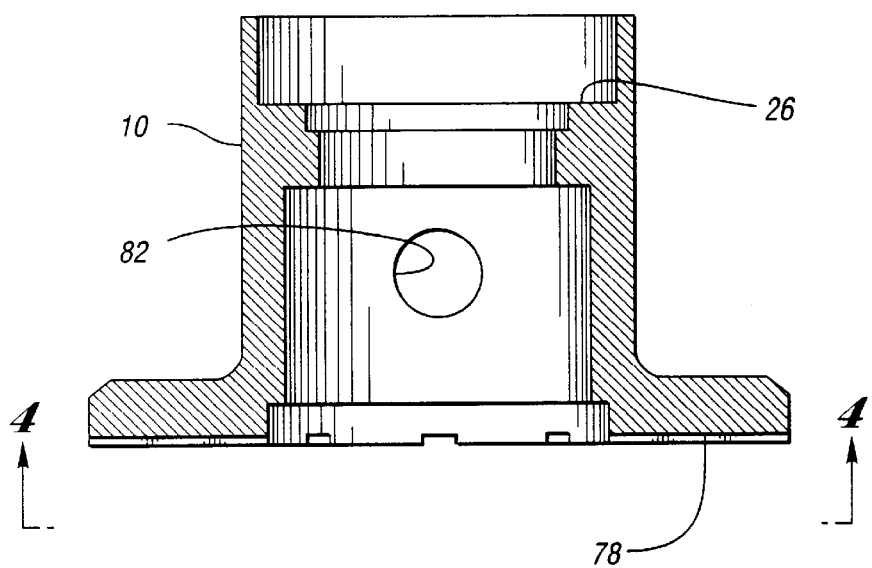
FIG. 3 is a cross-sectional view of the base of the assembly of FIG. 1.

As seen in FIG. 2, the piston 14 is provided with two threaded holes which extend radially through the piston at a location near the threaded portion 24. A set screw 54 is installed in each of the openings. Each set screw is provided with a dog point 56 which extends into the opening 30 in the piston 14 when the set screw is installed as shown in FIG. 2.

The handle 32, as seen in FIG. 5, has a pair of breech lock slots 58 and 60.

Figure 6:
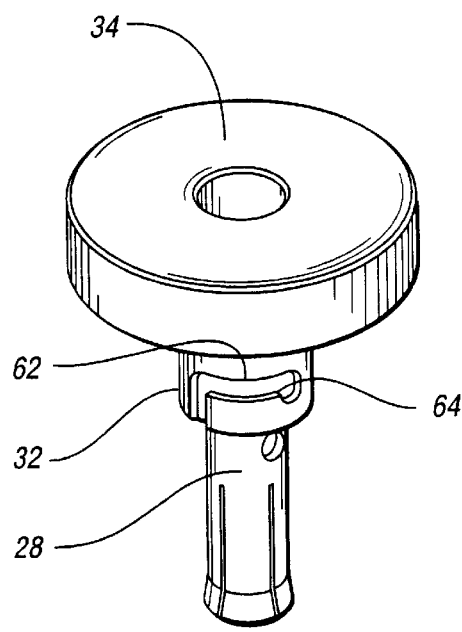
FIG. 6 is a perspective view of the handle of FIG. 1 together with a collet, which is also seen in the assembly view of FIG. 1.

When the handle 32 is inserted in the opening 30, as indicated in FIG. 1, the breech lock slots engage the dog point set screws 54. Circumferential grooves 62 permit rotation of the handle in a clockwise direction, as viewed in FIG. 6. The dog points 56 pass through the circumferential grooves 62 until they encounter the locking detents 64. A collet compression spring 66 forces the handle upward. The locking detents 64 prevent further relative rotation or disengagement.

As the handle 32 is inserted in the opening 30, collet spring 66 is compressed, as best seen in FIG. 1. The spring 66 is engaged by the end surface 68 of the handle 32, seen in FIG. 5.

The spring 66 is a relatively stiff spring. When it is compressed by the handle 32, it develops a force of about 20 lbs. It is seated on an annular shoulder 70, as shown in FIGS. 1 and 2. The force of the spring 66, when the handle is assembled as shown in FIG. 1, will force the collet in an upper direction, thereby creating a clamping force on the jaws 46 as the cone surface 50 of each jaw 46 engages the cone surface 52 on the piston 14. The collet and the piston act as a unitary assembly when the handle 32 is locked in position by the dog points 56.

The jaws 46 will secure the fiber optic terminal tip 48 securely in place with the clamping force developed by the spring 66.

The fiber optic terminal tip 48 is part of a fiber optic cable assembly 72. One example of a fiber optic cable assembly will be described with reference to FIG. 8.

The cable assembly 72 is inserted into the collet. A preliminary insertion of the cable assembly within the collet can be achieved by pressing on the grip portion 34 of the handle 32, thereby relieving the clamping pressure on the fiber optic terminal tip by the jaws 46. When the fiber optic cable assembly 72 is fully inserted, a collar 74 on the cable assembly engages a flat 76 on the collet 40. The distance between the flat 76 and the fiber optic terminal tip end is closely held during the manufacture of the cable. Typical tolerances are ±0.002 in.

The handle 32 and the collet can be removed from the piston 14 by applying a force on the handle that compresses the spring 16 to permit withdrawal of the cable assembly. As the handle then is rotated counterclockwise, the dog point set screws 54 disengage from the breech lock. The handle and the collet then can be pulled from the piston 14. Additional collet-handle assemblies are used when a fiber optic terminal tip having different dimensions must be polished. The fiber optic terminal tip and the collet appropriate for that tip can be selected from a kit.

Figure 4:
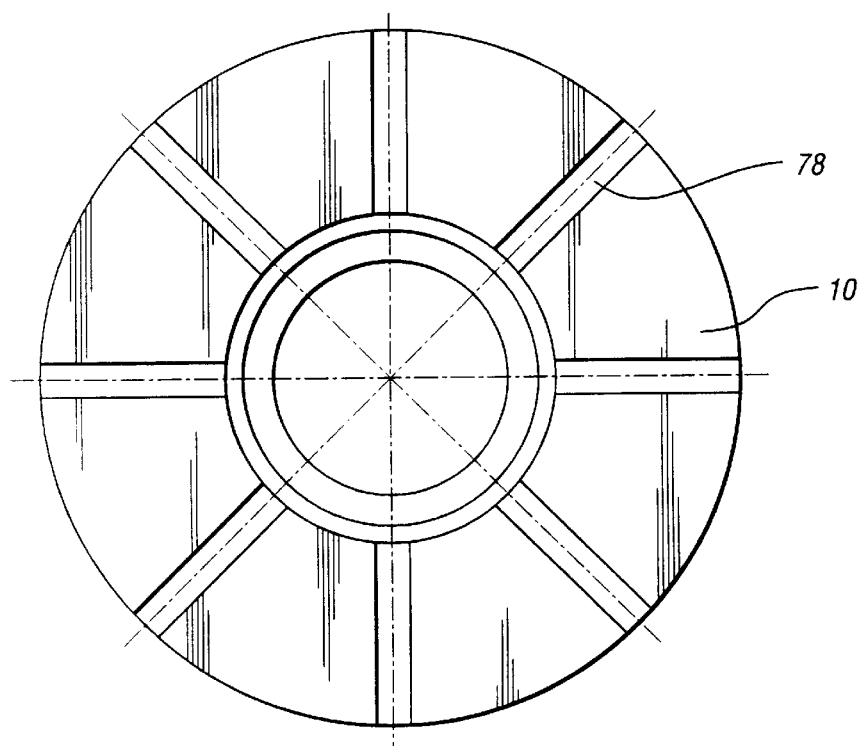
FIG. 4 is an end view of the base shown in FIG. 3 as seen from the plane of section line 4—4 of FIG. 3.

The base assembly 10 is provided with a plurality of radially extending channels or grooves 78 in its lower base surface, as seen in FIGS. 1 and 4. Four or eight channels or grooves 78, for example, may be used depending on the number of metal-cutting tool passes that are made across the base surface during manufacture of the polishing tool.

When the base assembly 10 rests on a polishing surface of a polishing plate 80, the tip 48 will be displaced slightly against the opposing force of the soft piston spring 18. The piston 14 thus will float in this fashion within the base assembly. The initial position of the floating piston 14 is fixed and predetermined by the locking ring which seats on the shoulder 26.

When the fiber optic terminal tip is assembled as shown in FIG. 1, a polishing compound such as aluminum oxide powder grit is applied to the surface of the plate 80. The aluminum oxide powder grit is in aqueous suspension in the form of a paste or slurry. When the base assembly 10 is moved over the plate 80, polishing action on the flat end surface of the fiber optic terminal tip will take place as a uniform force is applied to the fiber optic terminal tip by the floating piston 14. The channels or grooves 78 permit the slurry to flow radially outward from the center of the base, thereby avoiding a build-up of the polishing compound.

Further, the slurry can be washed out of the base assembly 10 without disassembly of the tool by forcing water into one of the ports 82. The water is discharged through another port 82 and through the annular gap between piston 14 and the base assembly 10, as seen in FIG. 2. As seen in FIG. 1, the cleansing water may pass freely through the channels or grooves 78 in the bottom surface of the base assembly 10, and through the annular chamber occupied by the spring 18.

The fiber optic terminal tips are cut during the manufacturing operation of the cable assembly to form a generally flat end surface. The fiber optic terminal tip then is polished with a coarse polishing compound. A finish polishing operation then may occur following the coarse polishing. The polishing compound used in forming the slurry is in powder grit form. The powder grit for coarse polishing may have a grit size of 1000 grade. For finish polishing, the grit size would be substantially finer.

After the scratches and other imperfections have been removed from the end face of the fiber optic terminal tip, the collet and the cable assembly are removed in the manner previously described. The fiber optic terminal tip then is inserted in a cable connector so that it may be joined to a companion connector for a cable end with the glass fiber thread in the terminals abutting to form an efficient light transmission path.

Figure 7:
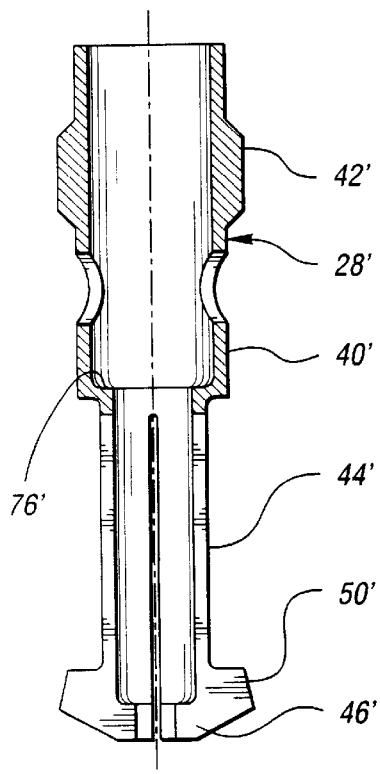
FIG. 7 is a cross-sectional view of a collet.

The collet illustrated in the assembly view of FIG. 1 has jaws of a different geometry than the geometry shown in the cross-sectional view of FIG. 7. This is done to illustrate that there may be a variety of collets to chose from for use with the tool of the present invention, depending upon the configuration of the fiber optic terminal tip to be polished during manufacture or during maintenance.

Figure 8:
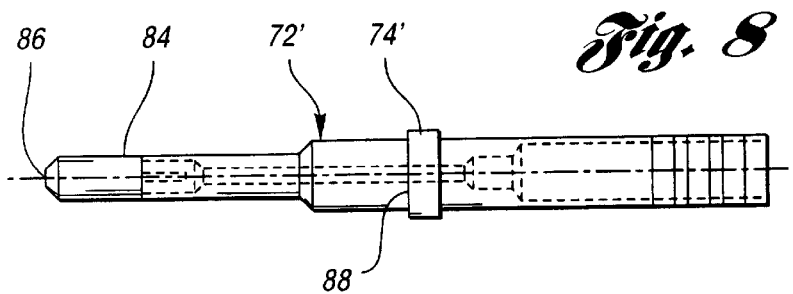
FIG. 8 is a side view of a fiber optic terminal tip that may be inserted in the collet shown in FIG. 7.

FIG. 8 illustrates an example of a typical fiber optic terminal tip to be held by the collet of FIG. 7. Prime notations are used with numerals in FIGS. 7 and 8 where corresponding numerals are used in FIG. 1.

The terminal tip 72' of FIG. 8 includes a ceramic sleeve 84 surrounding the glass fiber core or strand indicated in FIG. 8 at 86. A locating surface 88 on collar 74' on the fiber optic terminal 72', as seen in FIG. 8, engages the flat 76' of the collet. The distance of surface 88 of the collar 74' from the end surface of the terminal tip is a critical dimension, as mentioned previously, during the manufacture of the fiber optic terminal tip. The tolerance for that dimension is ±0.0015 in.

Shown in FIG. 1 is an annular collar 90 formed on the base assembly 10. This surrounds the locking ring 24, thereby protecting the locking ring against rotation during use of the polishing tool. The position of the locking ring on the piston is predetermined during manufacture of the tool, and its position is critical because it affects the protrusion of the fiber optic terminal tip at the bottom of the base assembly 10.

The polishing slurry prevents surface contact between the fiber optic terminal tip glass fiber and the polishing surface. Any surface contact would generate heat and spall the end surface of the fiber optic strand. Any scratch or other irregularity would decrease light transmission efficiency.

A surface smoothness of less than 7 microns can be achieved using aluminum oxide powder grit. The polishing slurry, which has a cooling effect on the fiber optic terminal tip does not build up on the surface and decrease the precision of the polishing operation because it is discharged through the channels or grooves in the base.

Although a particular embodiment of the invention has been illustrated and described, it is not intended that such disclosure illustrate and describe all possible forms of the invention. Variations of the designs of the present disclosure and equivalents thereof will be apparent to a person skilled in the art. All such alternate constructions, variations and equivalents fall within the scope of the following claims.

What is claimed is:

1. A polishing tool for polishing the end of a fiber optic terminal tip of a fiber optic cable comprising:

a base having an opening extending therethrough, a lower surface of the base engaging a polishing surface when the tool is in use, the opening having an axis normal to the base surface;

a piston movably mounted in the base opening whereby it is adjustable relative to the base in the direction of the axis;

a piston spring between the base and the piston for normally forcing the piston toward the polishing surface;

an opening in the piston with an axis normal to the polishing surface;

a collet in the piston opening, the collet having jaws for gripping the fiber optic terminal tip, the piston and the collet being connected together to form a unitary subassembly; and a locking element on the piston for precisely positioning the piston relative to the base surface;

the polishing surface being covered with a polishing compound;

the base having at least one port extending to the exterior thereof;

an annular space between the piston and the base defined in part by the base opening, the piston spring being located in the annular space, and radial passages located in the lower base surface;

the port, the annular space and the radial passages being in communication whereby an aqueous liquid may be discharged for flushing the polishing tool to prevent build-up of the polishing compound.

2. A fiber optic cable tip polishing mechanism for polishing a flat end surface of a cable tip comprising:

a base having a flat surface engageable with and supported on a flat polishing surface;

an opening in the base having an axis perpendicular to the flat surface of the base;

a piston in the base opening and movable relative to the base;

a collet in the piston including a collet spring for gripping and holding the cable tip in a normal position relative to the flat surface of the base;

the cable tip being positioned within the piston with the flat cable tip end surface protruding below the flat surface of the base; and a piston spring between the piston and the base for forcing the piston and the collet toward the polishing surface with a predetermined polishing force;

the piston being formed with a threaded portion;

a locking ring threaded on the threaded piston portion and engageable with the base, the locking ring defining a limit to the protrusion of the flat cable tip end surface;

the polishing surface being covered with polishing compound;

the base having at least one port extending from the opening in the base to the exterior thereof;

an annular space between the piston and the base defined in part by the base opening, the piston spring being located in the annular space; and radially extending passages located in the base surface;

the port, the annular space and the radially extending passages being in communication whereby an aqueous liquid is discharged for flushing the polishing tool to prevent build-up of the polishing compound.

3. A fiber optic cable tip polishing mechanism for polishing a flat end surface of a cable tip comprising:

a base having a flat surface engageable with and supported on a flat polishing surface;

an opening in the base having an axis perpendicular to the flat surface of the base;

a piston in the base opening and movable relative to the base;

a collet in the piston including a collet spring for gripping and holding the cable tip in a normal position relative to the flat surface of the base;

the cable tip being positioned within the piston with the flat cable tip end surface protruding below the flat surface of the base; and a piston spring between the piston and the base for forcing the piston and the collet toward the polishing surface with a predetermined polishing force;

the piston being formed with a threaded portion;

a locking ring threaded on the threaded piston portion and engageable with the base, the locking ring defining a limit to the protrusion of the flat cable tip end surface.

4. A fiber optic cable tip polishing mechanism for polishing a flat end surface of a cable tip, the mechanism comprising:

a base having a flat end surface engageable with and supported on a flat polishing surface;

an opening in the base having an axis perpendicular to the flat end surface;

a movable piston in the base opening;

a piston spring in the base opening normally forcing the piston toward the polishing surface;

a collet in the piston for holding the cable tip with the end of the cable tip protruding below the flat end surface of the base;

the piston being formed with a threaded portion;

a locking ring threaded on the threaded piston portion and engageable with the base, the locking ring defining a limit to the protrusion of the flat cable tip end surface as it precisely positions the piston relative to the base surface;

a handle within the piston, the handle and the collet being secured together to form a unitary subassembly; and a releasable lock for locking the handle within the piston.

5. The fiber optic cable tip polishing mechanism as set forth in claim 4 wherein the releasable lock includes interlocking elements on the handle and the piston; and a collet spring in the piston acting on the piston and the collet to create a cable tip holding force.

* * * * *